(12) United States Patent  (10) Patent No.: US 8,887,241 B2
Britton et al.  (45) Date of Patent: *Nov. 11, 2014

(54) VIRTUAL ROLES

(75) Inventors: Kathryn H. Britton, Chapel Hill, NC (US); Dieter Buehler, Tuebingen (DE); William P. Higgins, Durham, NC (US); Yi-Hsiu H. Wei, Austin, TX (US); Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1581 days.

This patent is subject to a terminal disclaimer.

(21) Appl. No.: 11/359,212

(22) Filed: Feb. 22, 2006

(65) Prior Publication Data

US 2007/0198522 A1   Aug. 23, 2007

(51) Int. Cl.
*H04L 29/06* (2006.01)
*G06F 21/62* (2013.01)

(52) U.S. Cl.
CPC .................... *G06F 21/629* (2013.01)
USPC ........................................................... 726/4

(58) Field of Classification Search
CPC .................................................... G06F 21/629
USPC ................... 726/1, 2; 340/5.8; 345/716, 726; 380/247, 250; 705/18, 44; 707/9; 709/225, 223, 224; 710/107, 125; 711/147, 153; 713/168, 164, 181, 186; 370/431, 468
See application file for complete search history.

(56) References Cited

U.S. PATENT DOCUMENTS

| | | | |
|---|---|---|---|
| 5,881,225 A | 3/1999 | Worth et al. | |
| 6,202,066 B1 | 3/2001 | Barkley et al. | |
| 6,385,724 B1 | 5/2002 | Beckman et al. | |
| 7,308,702 B1* | 12/2007 | Thomsen et al. | 726/1 |
| 7,596,803 B1* | 9/2009 | Barto et al. | 726/1 |
| 7,756,944 B2 | 7/2010 | Ikenoya | |
| 2002/0062449 A1 | 5/2002 | Perna et al. | |
| 2004/0064552 A1* | 4/2004 | Chong et al. | 709/224 |
| 2004/0083367 A1 | 4/2004 | Garg et al. | |
| 2004/0088563 A1 | 5/2004 | Hogan et al. | |
| 2004/0093526 A1 | 5/2004 | Hirsch | |
| 2004/0162894 A1* | 8/2004 | Griffin et al. | 709/223 |

OTHER PUBLICATIONS

International Search Report, PCT/EP2007/051 645, filed Feb. 22, 2006, mailed Jun. 13, 2007.

* cited by examiner

*Primary Examiner* — Pramila Parthasarathy
(74) *Attorney, Agent, or Firm* — Steven Greenberg, Esq.; CRGO Law

(57) ABSTRACT

Embodiments of the present invention address deficiencies of the art in respect to access control and provide a method, system and computer program product for access control management for a composite application. In a first embodiment, a method for role-based access control management for a composite application can be provided. The method can include selecting a component for deployment in a composite application and parsing a security policy for the component to identify a mapping between a specific role for the component and a virtual role for the composite application. Binding logic can be generated from the security policy and the component can be deployed into the composite application. Finally, security access operations for the virtual role can be processed through method calls to operations defined in the binding logic.

16 Claims, 4 Drawing Sheets

VIRTUAL ROLES

BACKGROUND OF THE INVENTION

1. Field of the Invention

The present invention relates to the concurrent display of multiple, heterogeneous application components and middleware components and more particularly to access control among multiple, heterogeneous application components and middleware components.

2. Description of the Related Art

Access control relates to the moderation and limitation of access rights to resources in a computing system. Resources can range from documents to application logic and access rights can range from read-only access to full read, write and execute access. Oftentimes, access control can vary from user to user or group to group depending upon the trustworthiness of the user or group. Those having a higher level of trust are granted access permissions associated with a high degree of access, while those having a lower level of trust are granted only an amount of access permission required to achieve a specific objective. In this way, the exposure of the security and integrity of the underlying resources can be minimized.

Access control for an application having only a limited number of users can be relatively manageable. For each individual user, a requisite level of access can be determined subjectively, and corresponding access rights can be assigned to the user. For an application which involves a vast number of often unpredictable individual users, access control can be unmanageable. Where the requisite access rights to various resources change for individual users in the latter scenario, access control, administration becomes a very complex task. This increasing complexity also increases the probability for access control mis-configurations to occur, compromising system security. To reduce complexity and its associated risk, system designers have introduced the mechanism of role-based access control.

Role-based access control relates to the assignment of access rights not to an individual user, but to a role fulfilled by one or more individual users. Specifically, it can be more readily determined what level of access rights are to be afforded to a user who fulfills a particular role in an application, such as an administrator, guest, manager, executive and the like. In the concept of workflow, roles can be extended to the type of user responsible for a portion of a business process. In this way, though the identity and roles assumed by any one user can be fluid in nature, the access rights afforded to a user assigned to a specific role can remain relatively static. Consequently, the management of access rights, even for a vast number of users, can be dramatically simplified.

Role-based access control solutions have been proposed for a variety of software systems. For simple systems, where a single application executes on a single middleware component, role-based access control has proven to be a powerful tool for mediating access control. Yet, though the use of application roles have been effective in abstracting access control for a simple system, role-based access control has not been effective in managing access control to an aggregation of disparate applications and/or middleware components— especially where the role-based access control systems vary from application to application and middleware component to middleware component within a composite application (the aggregation of heterogeneous applications).

Business roles have been proposed as a solution to the authorization problem in the composite application space. Business roles define an arbitrary combination of all application roles available for the composite applications. In this way, the disparate nature of the role-based access control for each application can be harmonized within at least one of the arbitrary combinations. Notwithstanding, it will be apparent to the skilled artisan that the mechanism of the business role is deficient at least in respect to potentially large number of business roles which must be defined to accommodate a set of disparate applications for various business objectives. Managing a large number of business roles can be burdensome. Moreover, the solutions integrator must have a priori knowledge of all of the application roles for the composite applications. Finally, not all business roles are valid and can result in the propagation of contradicting roles within the business roles and more complex access control management.

BRIEF SUMMARY OF THE INVENTION

Embodiments of the present invention address deficiencies of the art in respect to access control and provide a novel and non-obvious method, system and computer program product for virtual role based access control management for a collection of heterogeneous application components and middleware components. In a first embodiment, a data processing system for virtual role based-based access control management for multiple heterogeneous application components and middleware components, including enterprise archives, can include a virtual role framework where the roles definition can be abstract in nature, coupled to a composite application and enabled to manage virtual roles that can be defined by metadata for the composite application.

The system further can include application components and middleware components coupled to the composite application and a security policy defined for the application components and middleware components. The security policy for a application component or middleware component can map at least one specific role for the application component or middleware component to a corresponding virtual role for the composite application. Finally, the invention can produce binding logic derived from the security policy, the binding logic providing an interface for the virtual role framework to operations for the specific role of the middleware component.

The abstract virtual role meta-model allows for the definition of an arbitrary number of virtual roles. The virtual role product provider can include several exemplary pre-defined virtual roles such as an administrator virtual role and an operator virtual role; but, the virtual role meta-model allows product consumers to define virtual roles to suit the needs of respective composite applications. Yet further, the security policy can be a metadata model disposed in a descriptor for the application component or middleware component. As such, the binding logic can include program code generated by an metamodel-driven code generation tool such as the Eclipse™ Modeling Framework (EMF) (Eclipse is a trademark of the Eclipse Foundation) which utilizes the data model of the security policy. Finally, the virtual roles can provide a virtual role-based security framework for the application components and middleware components, category-based security (defined via common access category in multiple applications) for the composite application and the application components and middleware components, and graphical user interface based security for the composite application.

In another embodiment of the invention, a method for role-based access control management for composite applications can be provided. The method can include selecting an application component or middleware component for deployment in a composite application and parsing a security policy for the middleware component to identify a mapping between a specific role for the middleware component and a virtual role for the composite application. Binding logic can be generated from the security policy and the application component or middleware component can be deployed into the composite application. Finally, security access operations for the virtual role can be processed through method calls to operations defined in the binding logic.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for virtual role-based access control management for multiple heterogeneous application components and middleware components, collectively "components", through the use of a virtual role. A virtual role can be abstract and represents an aggregation of a set of various application roles based upon the common function and responsibility for each role. The virtual roles meta-model provides a means for defining arbitrary virtual roles as per the needs of the composite application. Virtual role names and actions can be mapped to one or more corresponding application component/middleware names and role names and actions on resources. Finally, the virtual framework can generate binding code based on the aforementioned mappings.

In accordance with an embodiment of the present invention, one or more virtual roles can be established for a composite application such as a portal application. Subsequently, a security policy can be specified for an application or middleware component to be deployed in the composite application, for example a portlet application component or a middleware component. The security policy can relate one or more of the established virtual roles to corresponding roles for the component. As such, binding logic can be generated to relate calls to the operations of the virtual roles to those of the component. Finally, the component can be registered for use in the composite application.

Figure 1:
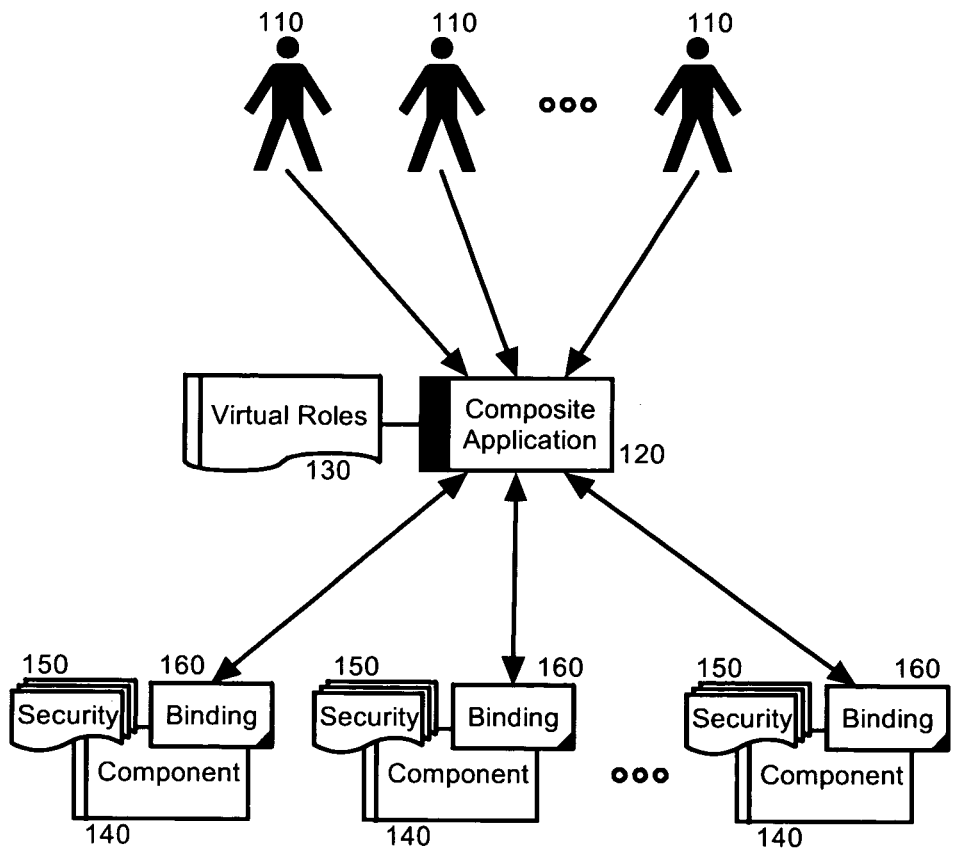
FIG. 1 is a pictorial illustration of a data processing system configured for virtual role-based access control management of a composite application consisting of multiple heterogeneous application components and middleware components; and, FIG. 2 is a schematic illustration of a data processing system for virtual role based access control management of a composite application consisting of multiple heterogeneous application components and middleware components; and, FIG. 3 is a flow chart illustrating a process for deploying a component in a data process system configured for virtual role-based access control management for multiple heterogeneous application components; and, FIG. 4 is a flow chart illustrating a process for accessing security logic in a component in a data process system configured for virtual role-based access control management for multiple heterogeneous application components.

In further explanation, FIG. 1 is a pictorial illustration of a data processing system configured for virtual role-based access control management for a composite application composed of multiple heterogeneous application components and middleware components. As shown in FIG. 1, one or more components 140 within a composite application 120 can include both a security policy 150 and binding logic 160. The security policy 150 can map roles specific to the components 140 to corresponding virtual roles 130 defined for the composite application 120. The binding logic 160, in turn, can be generated from the security policy 150 in order to provide a gateway interface from users 110 interacting with the composite application 120 to the operations of the specific roles for the components 140.

Figure 2:
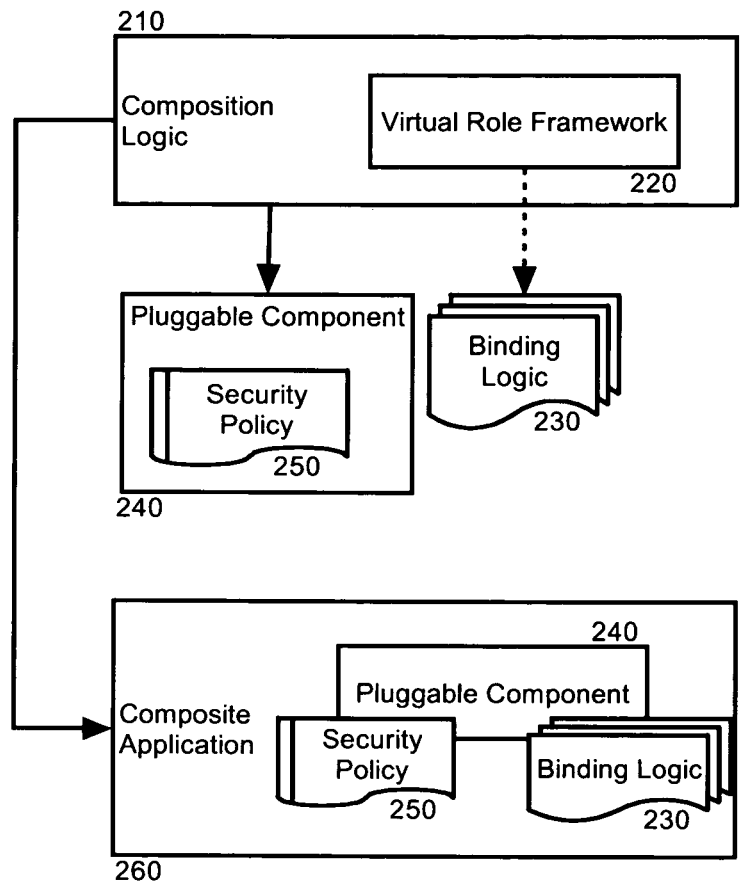

More specifically, FIG. 2 is a schematic illustration of a data processing system for virtual role based access control management for composite applications consisting of multiple heterogeneous application components and middleware components. As shown in FIG. 2, composition logic 210 acting as an aggregator can include a virtual role framework 220. The virtual role framework 220 can include a selection of security roles for all pluggable components 240 in a composite application 260 produced by the composition logic 210. Each component 240 in the composite application 260 can include a security policy 250. The security policy 250 can be a structured data model which maps the security virtual roles to corresponding specific roles for the component 240.

Using the security policy 250, binding logic 230 can be generated. Specifically, code generation technologies, such as an Eclipse Modeling Framework (EMF) code generation tool, can process the structured data model defined by the security policy 250 to produce the binding logic 230. The binding logic 230 can include security access classes and corresponding methods for the specific roles of the component 240. In this way, an end user authenticating to a virtual role managed by the virtual role framework 220 in the composition logic 210 can authenticate to the component 240 by way of the binding logic 230 without having an awareness of the specific roles of the component 240.

The use of virtual roles in the present invention provides for role-based security as provided by the mapped specific roles of the component 240. Also, the use of virtual roles provides for category based security in that different virtual roles can relate to different categories of user such as administrator, monitor, operator, configurator, user and the like. Finally, the virtual roles of the present invention can provide for graphical user interface based security in that the display of the composite application 260 can vary depending upon the virtual role assigned to an interacting end user, irrespective of the specific role of a component 240 mapped to the virtual role.

Figure 3:
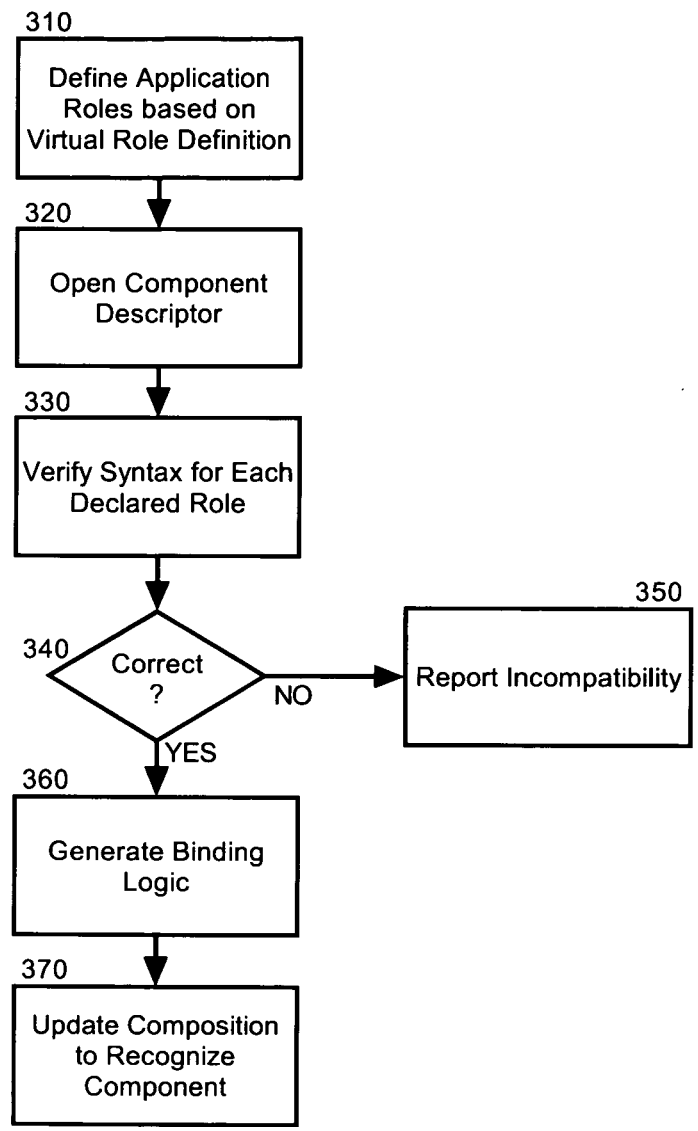

In further illustration, FIG. 3 is a flow chart illustrating a process for deploying a component in a data process system configured for virtual role-based access control management for multiple heterogeneous applications. Beginning in block 310, one or more specific application roles can be defined for a component based upon one or more corresponding virtual roles within the virtual role framework for an aggregated application. Examples can include an administrator role, a monitor role and a user role. In block 320, a descriptor for the component can be parsed to identify a security policy for the component.

In block 330, the syntax for each role declared within the security policy can be verified as well-formed and valid within the virtual role framework. In decision block 340, if the syntax is verified as incorrect, in block 350 an incompatibility with the declared role for the component can be reported. Otherwise, in block 360 binding logic can be generated for the declared roles within the security policy. For example, the data model represented by the security policy can be passed to an EMF tool to generate the requisite classes and methods for accessing the specific role for the component. Finally, in block 370, the composite application can be updated to recognize the new component.

Once the component has been deployed into the composite application, access requests to the component can be managed through the virtual role framework in association with the virtual role assigned to interacting users and not in association with specific roles assigned to interacting users in respect to the component. Specifically, required interactions with the access classes and methods for the specific role of the component can be provided by the virtual role framework utilizing the binding logic produced for the security policy for the component.

Figure 4:
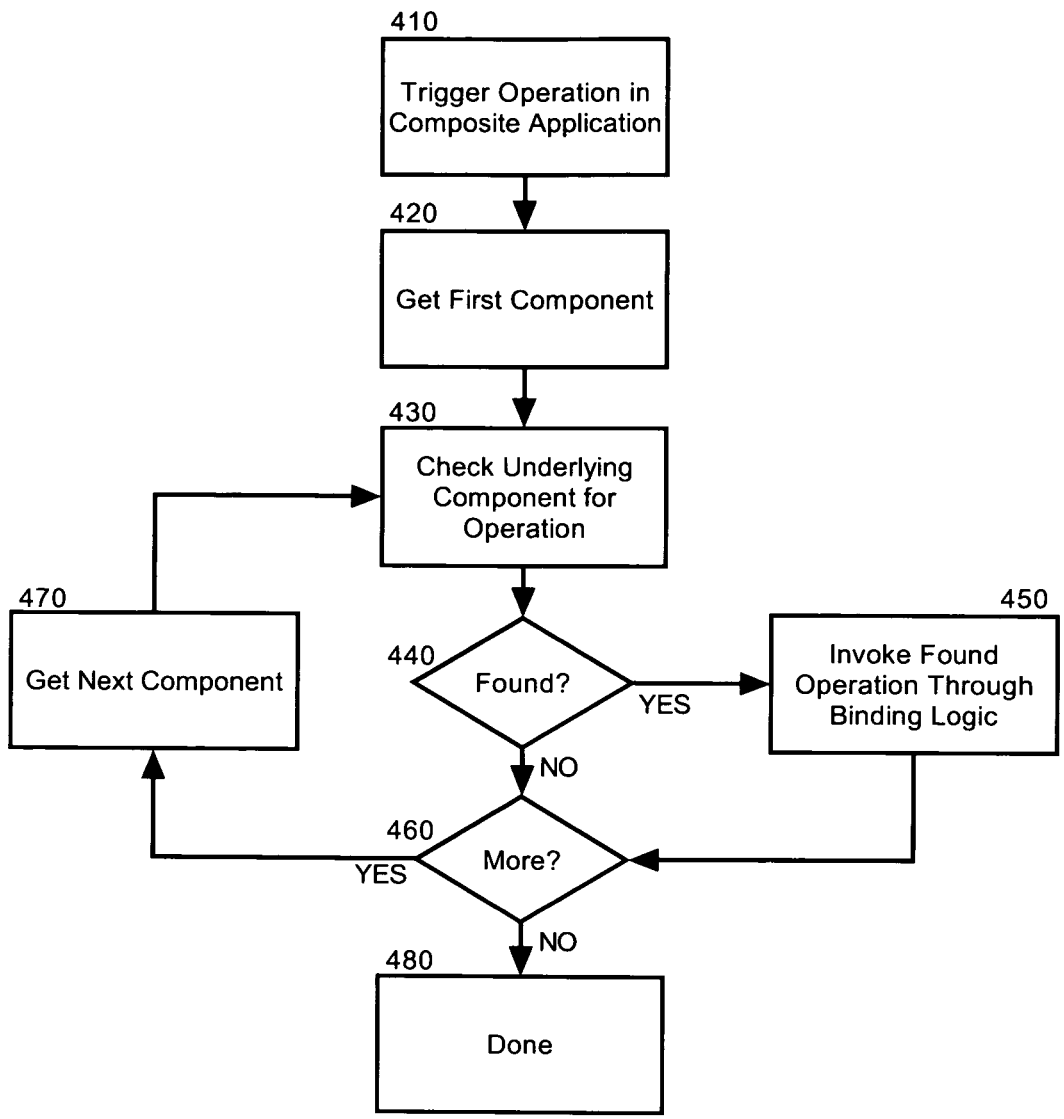

In illustration, FIG. 4 is a flow chart illustrating a process for accessing security logic in a component in a data process system configured for virtual role-based access control management for multiple heterogeneous components. Beginning in block 410, a security access operation can be triggered in the aggregated application. In block 420, a first component deployed in the aggregated application can be selected and in block 430, the binding logic of the selected component can be checked for the triggered operation. In decision block 440, if the operation is located within the selected component, in block 450 the operation in the component can be invoked through the binding logic. Otherwise, the process can continue through decision block 460.

In decision block 440, if the required operation cannot be located for the component, in decision block 460 it can be determined if additional components are deployed in the aggregated application. If so, in block 470, a next component can be selected for analysis and the process can repeat in blocks 430 through decision block 460. By comparison, in decision block 460, when no further components remain to be analyzed, the process can end in block 480.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The computer usable storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for role-based access control management for multiple heterogeneous application components comprising:

a virtual role framework coupled to a composite application executing in memory by a processor of a data processing system and enabled to manage a plurality of virtual roles for the composite application;

a component coupled to the composite application;

a security policy defined for the component, the security policy defining a structured data model that provides a mapping of at least one specific role for the component to a corresponding virtual role for the composite application;

a code generation tool processing the structured data model defined by the security policy to produce binding logic; and, binding logic comprising program code produced by the code generation tool from the security policy, the binding logic executing in the memory of the data processing system and providing an interface for the virtual role framework to operations for the specific role of the component, the logic comprising security access classes and corresponding methods for the specific roles of the component.

2. The system of claim 1, wherein the virtual roles comprise at least one of an administrator role, an operator role, a monitor role, a configurator role and a user role.

3. The system of claim 1, wherein the component is a component selected from the group consisting of an application component and a middleware components.

4. The system of claim 1, wherein the security policy is a data model disposed in a descriptor for the component.

5. The system of claim 4, wherein the binding logic comprises program code generated by a code generation tool utilizing the data model of the security policy.

6. The system of claim 1, wherein the virtual roles consolidate specific application roles and role assignments based upon the virtual roles bindings.

7. A method for role-based access control management for a composite application comprising:

selecting a component for deployment in a composite application in a virtual role framework coupled to the composite application executing in memory by a processor of a data processing system;

parsing a security policy the component, the security policy defining structured data model, to identify a mapping between a specific role for the component and a virtual role for the composite application;

generating binding logic from the security policy by processing the structured data model defined by the security policy, the binding logic comprising security access classes and corresponding methods for specific roles of the selected component;

deploying the component into the composite application; and, processing security access operations for the virtual role through method calls to operations defined in the binding logic.

8. The method of claim 7, wherein selecting a component for deployment in a composite application, comprises selecting a component selected from the group consisting of an application component and a middleware component, for deployment in a composite application.

9. The method of claim 7, wherein parsing a security policy for the component to identify a mapping between a specific role for the component and a virtual role for the composite application, comprises parsing a descriptor for the component to identify a plurality of specific roles defined in a data model which corresponding to virtual roles for the composite application.

10. The method of claim 9, further comprising verifying the defined specific roles in the descriptor for proper syntax.

11. The method of claim 9, wherein generating binding logic from the security policy comprises passing a security model of the component to a code generation tool to produce classes and operations for specific roles that at runtime allow an operation against a method of the virtual roles to produce calls to underlying components.

12. A computer program product comprising a computer usable storage medium comprising a memory device having computer usable program code for role-based access control management for a composite application, the computer program product including:

computer usable program code for selecting a component for deployment in a composite application;

computer usable program code for parsing a security policy for the component, the security policy defining a structured data model, to identify a mapping between a specific role for the component and a virtual role for the composite application;

computer usable program code for generating binding logic from the security policy by processing the structured data model defined by the security policy, the binding logic comprising security access classes corresponding methods for specific roles of the selected component;

computer usable program code for deploying the component into the composite application; and, computer usable program code for processing security access operations for the virtual role through method calls to operations defined in the binding logic.

13. The computer program product of claim 12, wherein the computer usable program code for selecting a component for deployment in a composite application, comprises computer usable program code for selecting a component selected from the group consisting of an application component and a middleware component, for deployment in a composite application.

14. The computer program product of claim 12, wherein the computer usable program code for parsing a security policy for the component to identify a mapping between a specific role for the component and a virtual role for the composite application, comprises computer usable program code for parsing a descriptor for the component to identify a plurality of specific roles defined in a data model which corresponding to virtual roles for the composite application.

15. The computer program product of claim 14, further comprising computer usable program code for verifying the defined specific roles in the descriptor for proper syntax.

16. The computer program product of claim 14, wherein the computer usable program code for generating binding logic from the security policy comprises computer usable program code for passing a security model of the component to a code generation tool to produce classes and operations for specific roles that at runtime allow an operation against a method of the virtual roles to produce calls to underlying components.

\* \* \* \* \*